| United States Patent [19] | [11] Patent Number: 4,780,101 |
| Watanabe et al. | [45] Date of Patent: Oct. 25, 1988 |

[54] RESIN TREATMENT OF CELLULOSIC FIBER-CONTAINING TEXTILE PRODUCTS

[75] Inventors: Akio Watanabe; Kazuo Sato, both of Kyoto, Japan

[73] Assignee: Dai-Ichi Kogyo Seiyaku Co., Ltd., Kyoto, Japan

[21] Appl. No.: 902,849

[22] Filed: Sep. 2, 1986

[30] Foreign Application Priority Data

Oct. 23, 1985 [JP] Japan .................................. 60-237980

[51] Int. Cl.$^4$ ............................................ D06M 13/34
[52] U.S. Cl. ...................................... 8/192; 8/115.67; 528/45
[58] Field of Search ................. 8/192, 115.67; 528/45, 528/71, 73, 75

[56] References Cited

U.S. PATENT DOCUMENTS

| 4,433,017 | 2/1984 | Goto et al. | 8/192 |
| 4,531,946 | 7/1985 | Christie et al. | 8/192 |

*Primary Examiner*—Paul Lieberman
*Assistant Examiner*—John F. McNally
*Attorney, Agent, or Firm*—Millen & White

[57] ABSTRACT

There is provided a method of finishing a cellulosic fiber-containing textile product with a resin bath based on a water-soluble urethane prepolymer. This treatment provides for improvements in dry and wet creased crease resistance and wash-and-wear properties of cellulosic fiber-containing textile products.

5 Claims, No Drawings

RESIN TREATMENT OF CELLULOSIC FIBER-CONTAINING TEXTILE PRODUCTS

BACKGROUND OF THE INVENTION

1. Field of the Invention

The present invention relates to a method for finishing cellulosic fiber-containing textile products. More particularly, the present invention relates to a method of treating a cellulose-containing textile with a resin bath formulated to impart improved crease resistance and wash-and-wear properties thereto.

2. Description of the Prior Art

Cellulosic fiber is a textile material available readily at low cost from abundant resources and because of its excellent dyeability, hygroscopicity and air permeability, this fiber provides attractive fabrics having good wearing comfort.

However, since cellulosic fabrics are generally inadequate in dry crease resistance and wet crease resistance, they become severely creased and wrinkled in use. These creases do not easily recover. Moreover, the wash-and-wear property of cellulosic textile fabrics is also poor.

Therefore, there has been a long-standing need for improvements in dry and wet crease resistances and in wash-and-wear property of cellulosic fabrics without detracting from their other inherent desirable properties. In attempts to meet these objectives, formaldehyde reaction products or formaldehyde-containing thermosetting resin precondensates such as urea-formaldehyde, melamine-formaldehyde, ethyleneurea-formaldehyde, glyoxalmonoureine-formaldehyde, etc. have been developed as resin finishing agents for cellulosic fabrics.

However, when these resin finishes are used singly in the processing of cellulosic textiles, the free formaldehyde liberated from the textile products tend to cause skin disorders and, therefore, the use of these finishes in the field of clothing is subject to serious limitations. Furthermore, these finishes do not provide fully satisfactory results in regard to dry crease resistance, wet crease resistance, wash-and-wear property and so on.

After intensive research undertaken to overcome the above-mentioned disadvantages of the prior art technology, the present inventors arrived at the present invention.

SUMMARY OF THE INVENTION

This invention relates to a method for finishing a cellulose fiber-containing textile product comprising treating a cellulose-containing textile product with a resin bath containing as an essential ingredient a water-soluble urethane prepolymer having at least two blocked isocyanato groups adapted to regenerate free isocyanato groups within its molecule (hereinafter referred to as a blocked isocyanate-containing water-soluble urethane prepolymer).

DETAILED DESCRIPTION

The blocked isocyanate-containing water-soluble urethane prepolymer used in accordance with the present invention is exemplified by water-soluble urethane prepolymers each containing at least two isocyanato groups blocked by one or more different blocking agents selected from the group consisting of phenols, oximes, imidazoles and acid sodium sulfite.

The water-soluble urethane prepolymer containing at least two isocyanato groups within its molecule is exemplified by water-soluble urethane prepolymers each containing two or more terminal isocyanato groups obtainable by reacting one or more polyether polyols, which are prepared by addition-polymerizing an alkylene oxide component of which ethylene oxide is an essential member with a compound containing at least two active hydrogen groups, or a mixed polyol consisting of a mixture of one or more members of said polyether polyols and one or more other polyols with one or more organic polyisocyanate compounds, and is preferably a water-soluble urethane prepolymer containing three or more terminal isocyanato groups and having a molecular weight of 2,000 to 30,000, an ethylene oxide content of 25 to 65% percent, and a regeneratable isocyanato content of 1 to 6 percent.

Outside of the above respective ranges, the hand and wet crease resistance of finished textile products are not as satisfactory as may be desired.

The polyether polyols mentioned above are exemplified by the compounds produced by addition-polymerizing a compound containing two or more active hydrogen groups with an alkylene oxide component of which ethylene oxide is an essential member.

The above-mentioned compound containing two or more active hydrogen groups includes, among others, polyhydric alcohols and amines. The polyhydric alcohols include diols such as ethylene glycol, propylene glycol, butanediol, hexanediol, octanediol, decanediol, etc.; triols such as glycerol, hexanetriol, trimethylolethane, trimethylolpropane, etc.; and polyols such as erythritol, pentaerithritol, sorbitol, sucrose, and so on. The amines include alkanolamines such as ethanolamine, triethanolamine, triisopropanolamine, tributanolamine, etc.; N-methylamine, ammonia, ethylenediamine, diethylenetriamine, triethylenetetramine, diaminophenylmethane, methylenebis-o-chloroaniline (MOCA), phenylenediamine, xylylenediamine, piperazine, isophoronediamine and so on.

The alkylene oxide includes ethylene oxide, propylene oxide, butylene oxide, etc. and ethylene oxide is essential.

Examples of said other polyols, are polyoxyalkylene polyols which do not contain ethylene oxide, polyester polyols, silicone polyols, fluorine-containing polyols and so on.

These polyoxyalkylene polyols may be produced by addition-polymerizing propylene oxide, butylene oxide or the like with said compound containing active hydrogen groups.

The polyester polyols include polycondensates of saturated or unsaturated fatty acids or anhydrides thereof with said polyhydric alcohols, said polyether polyols, said polyoxyalkylene polyols or the like.

The silicone polyols and fluorine-containing polyols include, among others, compounds containing a dimethylsiloxane or fluorocarbon unit in the backbone chain and hydroxyl groups at the terminals and/or in the side chain thereof.

When said other polyols are mixed with said polyether polyols, their proportions can be optionally chosen.

The organic polyisocyanates mentioned above include, among others, tolylene diisocyanate (TDI), diphenylmethane diisocyanate (p-MDI), liquid MDI, crude MDI, and other polyphenylpolymethyl polyisocyanates, hexamethylene diisocyanate (HDI), xylylene diisocyanate (XDI), isophorone diisocyanate (IPDI) and so on.

The water-soluble urethane prepolymers can be produced by various methods which are known per se. For example, they can be produced by reacting a polyether polyol or a mixture of such polyether polyol and one or more other polyols with an organic polyisocyanate at a temperature of about 30° to 120° C. for about 30 minutes to 48 hours.

The ratio of said polyether polyol or said mixture of said polyether polyol and other polyol or polyols to said organic polyisocyanate is preferably in the range of 1.1 through 2.0 in terms of NCO/active hydrogen group (molar ratio).

As the blocking agent used for blocking the free isocyanato groups of such water-soluble urethane prepolymer, there may be mentioned phenols such as phenol, butylphenol, chlorophenol, phenylphenol, etc.; oximes such as methyl ethyl ketoxime, cyclohexane oxime, acetoxime, etc., imidazoles such as imidazole, 2-methylimidazole, 2-ethylimidazole, 2-phenylimidazole, 2-undecylimidazole, 2-heptadecylimidazole, etc., acid sodium sulfite, and so on. These compounds are particularly desirable in view of their compatibility with textile processes, safety, reactivity, and so on.

The water-soluble urethane prepolymer having blocked isocyanato groups can be produced by reacting a water-soluble urethane prepolymer with a blocking agent in the presence or absence of a catalyst such as a tertiary amine or a metal compound such as sodium methoxide at a temperature of about 30° to 100° C.

In order to ensure the proper viscosity and homogeniety of the reaction system, an inert solvent such as dioxane, methyl-cellosolve acetate, ethylcellosolve acetate, dimethylformamide or the like may be added to the reaction system.

The ratio of said blocking agent to said water-soluble urethane prepolymer is one to 1.5 molar equivalents based on the free terminal isocyanato groups of the water-soluble urethane prepolymer.

As such a water-soluble urethane prepolymer containing blocked isocyanato groups is heated, the blocking agent is cleaved to thereby regenerate the free isocyanato groups.

As a typical method for treating a textile product in accordance with the present invention, a cellulose fiber-containing fabric is treated with a resin bath containing as an essential ingredient said water-soluble urethane prepolymer having blocked isocyanato groups.

Thus, a cellulose fiber-containing textile product is immersed in a resin bath containing said water-soluble urethane prepolymer having blocked isocyanato groups, squeezed, dried, and heat-treated at an elevated temperature.

In this process, a catalyst that is commonly used in urethane prepolymer reaction is added.

In the resin ath employed in the practice of the present invention, there are incorporated the formaldehyde addition product or formaldehyde-containing thermosetting resin precondensate (inclusive of those mentioned hereinbefore) which is commonly used in resin finishes and the corresponding catalyst (e.g. zinc chloride, magnesium chloride, zinc nitrate or an organic amine).

In the resin bath, there may also be incorporated various additives which are commonly used in resin finishes, such as softeners, fluorescent whiteners, natural or synthetic sizes, and hygroscopic agents.

The cellulose fiber-containing textile product includes, among other, those made of natural cellulose materials such as cotton, linen, etc. regenerated celluloses such as rayon, cuprammonium rayon, etc.; cellulose derivatives rich in unsubstituted hydroxyl groups such as acetate rayon, etc., mixtures or blends of such various cellulosic fibers, mixtures or blends of such cellulosic fibers with synthetic fibers or animal fibers, etc., and includes staples, tows, silvers, yarns, woven fabrics, knitted fabrics, nonwoven fabrics and so on.

The cellulose-fiber containing textiles treated in accordance with the present invention have markedly improved properties, in terms of dry crease resistance, wet crease resistance, wash-and-wear property, etc., and the improvement in wet crease resistance is particularly remarkable.

Furthermore, the method of the present invention does not require a complicated series of processing steps and is easy to practice.

The following examples are intended to illustrate the invention in further detail. It should be understood that in the examples all percents and parts are by weight.

PRODUCTION EXAMPLE

To a water-soluble urethane prepolymer was added a solution of a blocking agent in an inert solvent at a temperature within the range mentioned hereinbefore, followed by addition of a catalyst. The reaction was carried out until the free isocyanato groups were no longer detected. Thereafter, the reaction mixture was diluted with water to give a clear water-soluble urethane prepolymer containing blocked isocyanato groups (active component 30%). The reactants and products are shown in Table 1.

EXAMPLE 1

A 40'S cotton broad cloth was immersed in the resin bath indicated below, squeezed (squeezing rate 70%), dried in a hot air current at 110° C. for 3 minutes, and further heat-treated at 150° C. for 3 minutes.

The dry crease resistance, wet crease resistance, tensile strength, tear strength and wash-and-wear property of the resulting finished cloth were determined.

As a control example, a similar cloth was similarly treated with a resin bath of the otherwise same composition which lacked the water-soluble urethane prepolymer having blocked isocyanato groups.

The results are shown in Table 2.

| Resin bath | |
|---|---|
| A water-soluble urethane prepolymer having blocked isocyanato groups (active component 30%) | 10 parts |
| Catalyst: Elastolon catalys 32 (Daiichi Koyo Seiyaku, tradename) | 1 part |
| Dimethyloldihydroxyethyleneurea (active component 40%) | 7 parts |
| Catalyst: magnesium chloride (active component 20%) | 2 parts |
| Softner: polyethylene wax emulsion (active component 5%) | 2 parts |
| Water | 78 parts |

EXAMPLE 2

A 40'S W cotton plain weave cloth was immersed in the resin bath indicated below, squeezed (squeezing rate 75%), dried in a hot air current at 110° C. (for 3 minutes, and further heat-treated at 150° C. for 3 minutes.

The dry crease resistance, wet crease resistance, tensile strength, tear strength and wash-and-wear property of the resulting finished cloth were determined.

As a control example, a similar cloth was similarly treated with a resin bath of the otherwise same composition which lacked the water-soluble urethane prepolymer having blocked isocyanato groups.

The results are shown in Table 3.

| Resin bath | |
|---|---|
| A water-soluble urethane prepolymer having blocked isocyanato groups (effective component 30%) | 10 parts |
| Catalyst: Elastolon catalyt 32 (Daiichi Koyo Seiyaku, tradename) | 1 part |
| Dialkoxymethyldihydroxyethyleneurea (active component 45%) | 10 parts |
| Catalyst: zinc nitrate (active component 15%) | 3 parts |
| Polyethylene wax emulsion (active component 15%) | 2 parts |
| Water | 78 parts |

EXAMPLE 3

A 40'S W spun viscose rayon plain weave cloth was immersed in the resin bath indicated below, squeezed (squeezing rate 80%), dried in a hot air current at 100° C. for 2 minutes and further heat-treated at 160° C. for 2 minutes.

The dry crease resistance, wet crease resistance, tensile strength, tear strength and wash-and-wear property of the resulting finished cloth were determined.

As a control example, a similar cloth was similarly treated with a resin bath of the otherwise same composition which lacked the water-soluble urethane prepolymer having blocked isocyanato groups.

The results are shown in Table 4.

| Resin bath | |
|---|---|
| A water-soluble urethane prepolymer having blocked isocyanato groups (active component 30%) | 5 parts |
| Catalyst: Elastolon catalys 32 (Daiichi Koyo Seiyaku, tradename) | 0.5 part |
| Urea-formaldehyde precondensate (active component 30%) | 20 parts |
| Catalyst: an organic amine (active component 35%) | 2 parts |
| Water | 72.5 parts |

TABLE 1

Item — Urethane prepolymers containing isocyanato groups

| | Polyol | | | | Organic polyisocyanate Type | NCO/active hydrogen group (mol. ratio) | Mol. wt. of urethane prepolymer | Ethylene oxide in urethane prepolymer | Isocyanato content (%) of urethane prepolymer | Regeneratable isocyanato content (%) of urethane prepolymer | Amount of urethane prepolymer (parts) |
|---|---|---|---|---|---|---|---|---|---|---|---|
| Type | Active hydrogen compound Type | Total alkylene oxide Type | (%) | Molecular weight | | | | | | | |
| No. 1 | Glycerin | PO<br>EO | 30<br>70 | 3000 | HDI | 2 | 3600 | 56.86 | 3.5 | 3.5 | 116.8 |
| No. 2 | Glycerin | PO<br>EO | 30<br>70 | 3000 | HDI | 1.5 | 8842 | 25.41 | 1.9 | 1.9 | 210 |
| | Glycerin | PO | 100 | 5000 | | | | | | | |
| | Glycerin | PO<br>EO | 90<br>10 | 2000 | | | | | | | |
| No. 3 | Tri-methylolpropane | EO | 100 | 1000 | HDI | 1.5 | 2333 | 28.28 | 4.5 | 4.5 | 283.5 |
| | Diethylene glycol adipate | | | 1000 | | | | | | | |

| | | Item | | | |
|---|---|---|---|---|---|
| | | Blocking agent | | Blocking agent/free isocyanato group (mol. ratio) | Inert solvent Type/amount (parts) | Catalyst Type/amount (parts) |
| Type | Type | Amount (parts) | | | |
| No. 1 | Phenol | 9.2 | 1.01 | Dioxane: 30 | Triethylamine: 0.2 |
| No. 2 | p-Butylphenol | 15.9 | 1.01 | Dioxane: 100 | Triethylamine: 0.4 |
| No. 3 | Methyl ethyl ketoxime | 27.2 | 1.00 | Methyl ethyl ketone: 60 | — |

PO: Propylene oxide
EO: Ethylene oxide

TABLE 2

| Test No. | Type of water-soluble urethane prepolymer containing blocked isocyanato groups | Crease resistance (degree) | | | | Tensile strength (Kg) | Tear strength (g) | Wash-and-wear property (grade) |
|---|---|---|---|---|---|---|---|---|
| | | Dry crease resistance | | Wet crease resistance | | | | |
| | | HL-0 | HL-10 | HL-0 | HL-10 | | | |
| 1-1 | No. 1 | 272 | 268 | 281 | 279 | 14.6 | 715 | 3.8 |
| 1-2 | No. 2 | 268 | 267 | 282 | 271 | 14.8 | 738 | 3.5 |
| 1-3 | No. 3 | 270 | 264 | 280 | 275 | 14.6 | 720 | 3.8 |
| Reference example | — | 240 | 205 | 230 | 198 | 15.1 | 735 | 2.8 |
| Blank control (substrate fabric only) | — | 148 | 150 | 150 | 159 | 21.3 | 980 | 1.2 |

Laundering conditions: according to JIS-L-0217-103
HL-0, 0 laundering
HL-10, 10 laundering (drip dry method)
Crease resistance: according to JIS-L-1096C (warp and filling)
Tensile strength: according to JIS-L-1096A (filling direction)
Tear strength: according to JIS-L-1096D (warp direction)
Wash-and-wear property: according to AATCC-124-1967T III B
The above applies to the examples that follow.

TABLE 3

| Test No. | Type of water-soluble urethane prepolymer containing blocked isocyanato groups | Crease resistance (degree) | | | | Tensile strength (Kg) | Tear strength (g) | Wash-and-wear property (grade) |
|---|---|---|---|---|---|---|---|---|
| | | Dry crease resistance | | Wet crease resistance | | | | |
| | | HL-0 | HL-10 | HL-0 | HL-10 | | | |
| 2-1 | No. 1 | 260 | 256 | 281 | 277 | 20.7 | 889 | 3.5 |
| 2-2 | No. 2 | 263 | 251 | 278 | 274 | 20.8 | 832 | 3.3 |
| 2-3 | No. 3 | 265 | 259 | 282 | 274 | 20.7 | 799 | 3.7 |
| Reference example | — | 241 | 213 | 225 | 198 | 21.4 | 785 | 2.1 |
| Blank control (substrate fabric only) | — | 169 | 165 | 167 | 170 | 28.5 | 801 | 1.5 |

TABLE 4

| Test No. | Type of water-soluble urethane prepolymer containing blocked isocyanato groups | Crease resistance (degree) | | | | Tensile strength (Kg) | Tear strength (g) | Wash-and-wear property (grade) |
|---|---|---|---|---|---|---|---|---|
| | | Dry crease resistance | | Wet crease resistance | | | | |
| | | HL-0 | HL-10 | HL-0 | HL-10 | | | |
| 3-1 | No. 1 | 266 | 261 | 267 | 262 | 20.9 | 1580 | 3.6 |
| 3-2 | No. 2 | 260 | 252 | 278 | 268 | 21.0 | 1605 | 3.5 |
| 3-3 | No. 3 | 273 | 270 | 275 | 261 | 19.9 | 1585 | 3.4 |
| Reference example | — | 236 | 209 | 173 | 168 | 20.0 | 1520 | 2.5 |
| Blank control (substrate fabric only) | — | 210 | 205 | 161 | 165 | 24.3 | 2218 | 1 |

What is claimed is:

1. In a method for finishing a textile product to impart crease resistance and wash and wear properties to the textile product, which comprises the steps of treating a cellulose fiber-containing textile product with a resin bath containing a formaldehyde-containing, thermosetting resin, and heating the treated textile product at an elevated temperature, the improvement wherein said resin bath also contains an amount effective to enhance those properties of a water-soluble urethane prepolymer having a plurality of isocyanato groups blocked with a phenol, an oxime or an imidazole compound, said water-soluble urethane prepolymer having a molecular weight of 2,000 to 30,000, a polyether polyol-forming ethylene oxide content of 25 to 60 percent, an NCO/active hydrogen group molar ratio of 1.1 to 2.0 and a blocked isocyanato content of 1 to 6 percent.

2. The method according to claim 1 wherein said water-soluble urethane prepolymer is a reaction production between one or more organic polyisocyanates and one or more polyether polyols which are obtainable by addition-polymerizing a compound containing at least two active hydrogen groups with an alkylene oxide component of which ethylene oxide is an essential member.

3. The method according to claim 1 wherein said water-soluble urethane prepolymer is a reaction product of a mixture of one or more of said polyether polyols and one or more other polyols with one or more organic polyisocyanates.

4. The method according to claim 1, wherein the textile product is an all cellulosic fabric.

5. The method of claim 4, wherein the cellulosic fabric is a woven all cotton fabric.

* * * * *